July 7, 1970     HIKOKURO KANIE     3,519,871
ELECTROLUMINESCENT CELL OF NOVEL STRUCTURE
Filed Oct. 27, 1966     2 Sheets-Sheet 2
FIG. 10     FIG. 11     FIG. 12
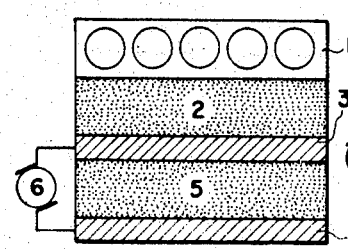
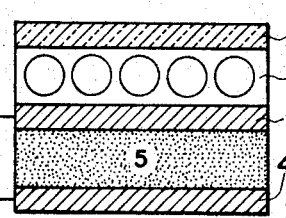
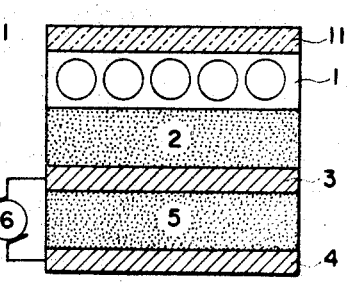
FIG. 13     FIG. 14     FIG. 15
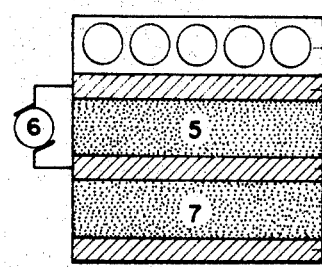
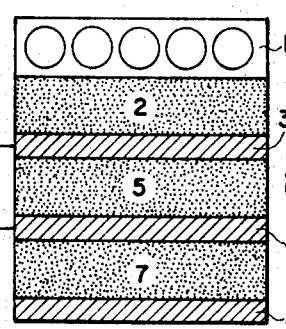
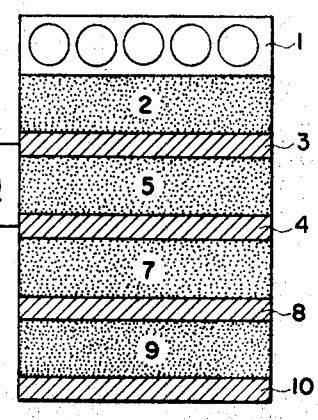
FIG. 16     FIG. 17
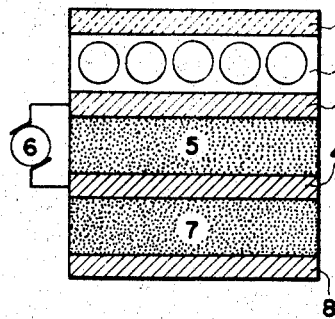
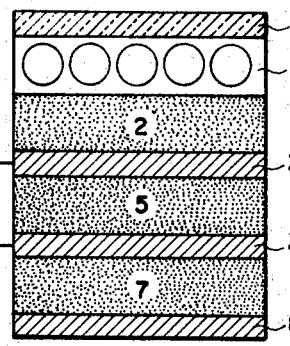
*INVENTOR.*
HIKOKURO KANIE
BY *Wendroth, Lind and Ponack,*
*attorneys*

United States Patent Office

3,519,871
Patented July 7, 1970

3,519,871
ELECTROLUMINESCENT CELL OF
NOVEL STRUCTURE
Hikokuro Kanie, Tokyo-to, Japan, assignor to Mitsubishi
Plastics Industries, Limited, Chiyoda-ku, Tokyo, Japan,
a company of Japan
Filed Oct. 27, 1966, Ser. No. 590,048
Claims priority, application Japan, Feb. 5, 1966,
41/6,391
Int. Cl. H05b 33/12
U.S. Cl. 313—108     11 Claims

ABSTRACT OF THE DISCLOSURE

An electroluminescent element which consists essentially of a phosphor layer and a pair of electrodes. The electrodes are both attached on only one side of the phosphor layer, the other side of the phosphor layer having no electrodes thereon. The electrodes can be in the same plane, in which case they are less in area than the area of the phosphor layer, or can be superposed and separated by a layer of dielectric material, in which case it is preferred that the electrodes have the same cross sectional area as the area of the phosphor layer. An additional dielectric layer can be provided between the electrodes and the phosphor layer, and an additional dielectric layer can be provided on the opposite side of the electrodes from the phosphor layer.

---

The present invention relates to an electroluminescent cell, and more particularly, to a novel electroluminescent cell the construction of which is entirely different from that of the known type.

As is known, Destriau discovered in 1936 a phenomenon that a phosphor emits light by the application of an electric field through a pair of electrodes. A typical construction of an electroluminescent cell based on the electroluminescent phenomenon comprises an electroluminescent phosphor dispersed in a dielectric layer sandwiched between a pair of electrodes one of which is light transmitting to cause the phosphor to emit light under the influence of an electric field applied thereto. It has been proposed to improve an electroluminescent cell by the provision of a high dielectric layer between the phosphor and the non-transparent electrode in order to have an enhanced electric insulation as well as a high dielectric constant, whereby an increase of applied voltage as well as photoemissive efficiency can be attained. A number of typical electroluminescent cells comprising an electroluminescent phosphor embedded in a high dielectric medium sandwiched between a pair of electric conducting layers at least one of which is transparent or light transmitting have been available in the market.

I have discovered during my years of research in connection with the improvement of electroluminescent efficiency together with the prevention of insulation breakdown that an electroluminescent cell of novel construction comprising a pair of electrodes provided on one side of a phosphor layer not sandwiched between them can emit light in response to the application of an electric field. It seems at first sight to be impossible for the novel electroluminescent cell of this invention to emit light, because it consists of a construction comprising a pair of electrodes provided on one side of an electroluminescent phosphor which is completely different from that of a known cell comprising a phosphor layer sandwiched between two electrodes. However, it has been found that the electroluminescent cell of this invention comprising the two electrodes provided on one side of the phosphor is able to emit light by applying voltage thereto.

Two distinctive types have been considered in connection with the novel electroluminescent cell of this invention comprising the two electrodes provided on the one side of the phosphor. One of them is a construction of an electroluminescent cell in which one electrode is provided spaced from the other one in the same plane on one side of the phosphor, and the other is a laminated construction in which the phosphor is laminated on one side relative to the two electrodes. They will be described in detail hereinafter.

An essential characteristic of the novel electroluminescence cell of this invention lies in the lack of the necessity for a transparent or light transmitting electrode because the phosphor is not sandwiched between two electrodes. This should be an advantage over the prior art from an economical point of view of the uselessness of an expensive transparent electrode. Thus, either first or second type of the electroluminescent cell of this invention is characterized by the absence of the transparent electrode. In the conventional electroluminescent cell, it is required that at least one of the electrodes should be absolutely transparent. Without the transparent electrode, the electroluminescent cell of prior art would not function.

In spite of a profound and extended progress of research on the photoemission effect of electroluminescent material in general, it seems that a complete elucidation thereof is still to be found. Therefore, in reference to the reason for the photoemission of the two novel types of electroluminescent cell of this invention, a precise explanation thereof is also still to be found. However, it has been demonstrated in a series of experiments that the electroluminescent cell of this invention can emit light by applying voltage thereto.

Therefore, it is an object of the invention to provide an entirely novel construction of an electroluminescent cell without a transparent or light transmitting electrode, an indispensable element in the electroluminescent cells of the prior art.

It is another object of the invention to provide an electroluminescent element of novel construction which is easy to carry out and is adapted for mass production and a novel electroluminescent cell containing the same.

It is still another object of the invention to provide a method for the manufacture of an electroluminescent element of novel construction which is easy to carry out and is adapted for mass production and a novel electroluminescent cell containing the same.

Lastly, it is a still further object of the invention to provide a novel type electroluminescent element and a novel type electroluminescent cell containing the same which lends itself to fabrication by the use of the same manufacturing equipment and processes employed heretofore while being less costly to manufacture than previously known ones.

Further objects and advantages of the invention will appear from the following detailed description and from the accompanying drawings showing diagrammatical sectional views, and more particularly, of an element thereof, respectively.

As described hereinbefore, there are two types of the novel electroluminescent element of this invention, and FIGS. 1–8 show the first type and FIGS. 9–17 the second one.

Referring to the drawings, FIG. 1 is a diagrammatical sectional view of a simple and fundamental form of the first type of electroluminescent element in accordance with the present invention.

FIG. 10 is a view similar to FIG. 9 showing an electroluminescent element provided with two layers of high dielectric material.

FIG. 11 is a view of an electroluminescent element similar to that of FIG. 9 on the top of which is a free electric conducting layer.

FIG. 12 is a view of an electroluminescent element similar to that of FIG. 9 on the top of which is a free electric conducting layer.

FIGS. 13–15 are diagrammatic sectional views of electroluminescent elements having a plurality of electrodes together with a plurality of high dielectric layers, respectively.

FIGS. 16–17 are views of electroluminescent elements similar to those of FIGS. 13–14 on the top of which is a free electric conducting layer, respectively.

Figure 1:
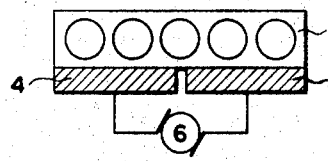

Before I describe my invention in detail, I wish to point out that the description is limited an electroluminescent element, not an electroluminescent cell, for the sake of simplicity. It will be understood that the electroluminescent cell can be made from an electroluminescent element by adding an electric lead together with a terminal, and a hermetically sealed housing therefor.

Referring again to FIG. 1 in more detail, the electroluminescent element of this invention comprises a phosphor layer 1 and a pair of electrodes 3 and 4. As clearly shown in this figure, the electrodes 3 and 4 are provided on one side of the phosphor layer 1; in other words, the electrodes 3 and 4 are put side by side in the same plane below the phosphor layer 1, and one electrode 3 is electrically separated from the other 4, but connected to an electrical source 6.

The novel structure of the electroluminescent element shown in FIG. 1 is entirely different from that of the conventional electroluminescent element. The known electroluminescent element of the prior art comprises a phosphor layer 1 sandwiched between a pair of layers or electrodes 3 and 4 at least one of which is transparent or is a light transmitting electrode. This transparent electrode is provided in order to transmit light emitted by the phosphor layer outwardly. On the contrary, however, the novel electroluminescent element of this invention comprises a pair of electrodes provided on one side of the phosphor layer, so the use of at least one transparent electrode is not required, because the light emitted by the phosphor layer radiates from the other side thereof.

Figure 2:
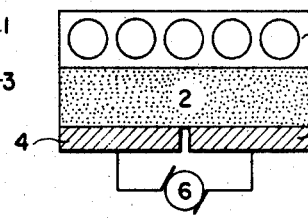
FIG. 2 is a view similar to FIG. 1 in which a high dielectric layer has been added to the element.

The two electrodes can be provided in direct contact with the phosphor layer 1 (FIG. 1) and a high dielectric material layer 2 can be provided in direct contact with the phosphor layer 1, and the two electrodes are provided in direct contact with the high dielectric material layer, and they are connected to the electric source 6 (FIG. 2).

It is understood that as a phosphor material adapted for the electroluminescent element of this invention, ZnS, SiC, GaP, CdS and other similar substances including electric photoemissive semiconductors are employed.

A phosphor layer can be selected from a group consisting of phosphor particle layer, phosphor particle layer containing metallic powder, such as, iron, a phosphor particle layer containing dielectric particles, a layer of phosphor particles dispersed in an adhesive transparent dielectric substance, such as, cyanoethylcellulose, nitrocellulose, a high molecular silicone compound, and other similar transparent adhesive dielectric substances.

A dielectric layer can be elected from a group of materials consisting of dielectric particles dispersed in an adhesive dielectric material, and a sintered mixture of ceramic and dielectric substances in the form of a layer. A high dielectric particle material can be selected from a material consisting of $MTiO_3$ (M=Ba, Ca, Pb, Y and Sr), $MSnO_3$ (M=Ba, Sr, Cu, Ca, Bi and Y), $TiO_2$ and other high dielectric substances.

An electrode or electric conducting layer can be selected from a metallic material consisting of iron, aluminum, silver, copper and other good conducting substance, and it can be used in the form of wire, wire-net, sheet, foil, vacuum plated film, and precipitated film.

As described hereinbefore, it has been discovered that the phosphor layer of the electroluminescent element of the first form of this invention is excited and emits light by applying an electric voltage to the electrodes 3 and 4, although the phosphor layer is not sandwiched between them. In addition, it has been found that the brightness of the photoemission of the electroluminescent element is lowered when the gap between the two electrodes in the same plane is increased, and it is preferred that this gap be less than 0.1 mm.

Further, I have discovered that when the surface area of electrodes 3 and 4 is equal, the brightness per unit area of photoemission thereof is about one-half of that of the conventional electroluminescent cell for the same excitation. Further research has indicated that as the ratio of the areas of the two electrodes increases the brightness opposite the electrode of small area increases, and when the ratio of the areas amounts to about ten, the brightness approaches the same extent; when the ratio of the areas is more than ten, the brightness increases only a little; on the contrary, the brightness opposite the electrode of large area is reduced.

In the electroluminescent element of FIG. 2 in which a high dielectric layer 2 is provided between the phosphor layer 1 and the electrodes 3 and 4, it has been found that the brightness increases as the thickness of this dielectric layer decreases.

Figure 3:
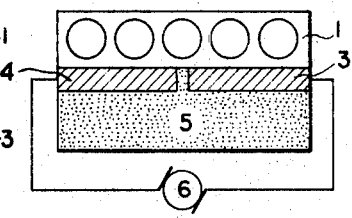
FIG. 3 is a view similar to FIG. 2 showing a modified position of the high dielectric layer in the element of FIG. 2.
Figure 4:
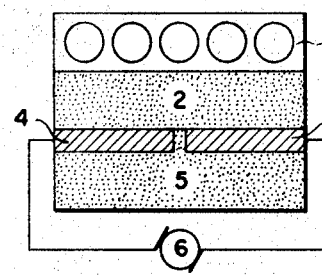
FIG. 4 is a view similar to FIG. 1 showing an electroluminescent element provided with two layers of high dielectric material.
Figure 5:
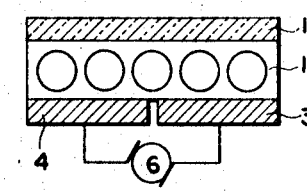
FIGS. 5–8 are views of the electroluminescent elements of FIG. 1–4, respectively on the tops of which are free transparent electric conducting layers, the definition of "free" being set forth hereinafter.
Figure 6:
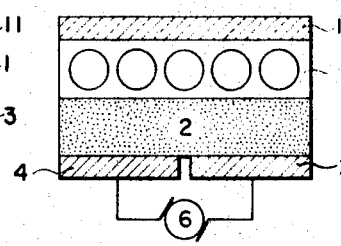
Figure 7:
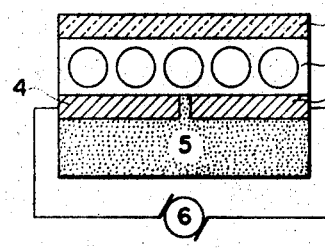
Figure 8:
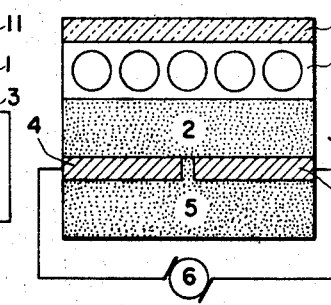

Further, it has been found that the brightness of photoemission increases with the addition of an additional thin film 5 of dielectric having a thickness of 5–25 microns below the electrodes as shown in FIGS. 3–4.

During excitation, the phosphor layer above the electrodes emits light, but a precise theory of photoemission is not clear. It seems polarization takes place in the phosphor layer when an electric voltage is applied thereto with the result that the phosphor particles are excited to emit light.

In accordance with the novel electroluminescent element of this invention, it has been discovered that a semiconductor such as ZnS hitherto considered to have an adverse photoemission effect when excited by direct current emits light easily when thus excited, and another semiconductor such as GaP heretofore regarded as non-photoemissive when excited by alternating current emits light when thus excited.

In the electroluminescent element of this invention, it has been demonstrated that if a photoconductive semiconductor is used in place of an electroluminescent semiconductor, the ratio of resistance when exposed to light to resistance when not exposed to light is considerably augmented. By the method of this invention, it has also been found that a semiconductor can be excited to be photoconductive. In general, the resistance of a photoconductive semiconductor decreases when it is irradiated with a light beam or radiant ray. Therefore, the scope of this invention includes the method of exciting a photoconductive semiconductor, and if the electroluminescent element of this invention employs a photoconductive semiconductor such as ZnO, it is understood that the same is included within the scope of this invention.

Provision of a transparent electrode is not required on the light emitting surface of the phosphor of the electroluminescent element of this invention as mentioned hereinbefore. Accordingly, the fabricating technique as well as manufacturing cost thereof is easy and simplified, which should be advantageous.

In addition, when a pair of the first type electroluminescent elements of this invention are constructed in a symmetrical form with the electrodes at the center, we can form an electroluminescent element having two light emitting faces on opposite sides thereof without recourse to a transparent electrode.

My invention will be described in connection with the examples hereinbelow.

EXAMPLE 1

A coating composition adapted to form the electroluminescent phosphor and being of ZnS particles dispersed in a solution of cyanoethylcellulose in a weight ratio of 4:1 is coated on a transparent substrate such as a synthetic resin sheet and glass pane in a thickness of 40 microns, and dried to a thickness of 10 microns to form a phosphor layer thereon. Then, on this phosphor layer, a plurality of aluminum strips 2 mm. wide are either vacuum plated or printed to form a series of grid electrodes spaced 0.1 mm. from one another, the ends of electrodes being electrically connected alternately. This construction of aluminum electrodes seems complicated, but takes a fundamental shape as shown in FIG. 1. On applying an electric voltage, 100 volts, 60 cycles to the electrodes, the phosphor layer corresponding to the gap between the electrodes emits light. The electroluminescent element having added thereto a layer, 10 microns thick, of barium titanate as a dielectric layer as shown in FIG. 3 emits light with a little stronger brightness than that of FIG. 1.

EXAMPLE 2

A dielectric layer 10 microns thick is formed of a sintered barium titanate powder. On one side of this dielectric layer two parallel electrodes insulated from each other and of aluminum are provided, and on the other side ZnS is vacuum plated to produce an electroluminescent element of FIG. 2. On applying 100 v., 60 cycles to the parallel electrodes, the phosphor layer corresponding to the gap between electrodes emits light. When another dielectric layer 10 microns thick of barium titanate is attached to the element as shown at 5 in FIG. 4, an increase of brightness is perceived.

The first type electroluminescent element of this invention together wtih the examples has been described. Furthermore, I have discovered that the brightness of the electroluminescent element of my invention can be improved by providing a transparent electric conducting layer on the phosphor layer as a top layer. In this case, voltage is applied to the parallel electrodes only, not to the transparent electric conducting layer. The transparent electric conducting layer is called a "free conducting layer" in this specification. It has been found that the brightness is improved by this free conducting layer, and further, the whole phosphor surface in contact with the transparent conducting layer emits light.

FIGS. 5–8 show the electroluminescent elements of FIGS. 1–4 provided with the free conducting layers 11 on the tops, respectively.

The material of the free conducting layer should be transparent because it is necessary to transmit light. Therefore a known transparent film, such as, vacuum plated tin oxide film, titanium oxide film, a high molecular substance, such as, tetracyanoquinone, and other similar substances can be used.

In general, it is known that the electroluminescent cell can emit light only with the application of an alternating voltage. However, it has been found in my electroluminescent element that any voltage, alternating, direct or superposed alternating and direct can be applied as well. The reason for the increase of brightness of my first type electroluminescent element owing to the provision of a free conducting layer on its top is not precisely known. It seems the phosphor layer in contact with the free conducting layer emits light because the electric field is enlarged by the dielectric phenomenon in the presence of the free conducting layer.

The Examples 3 and 4 relate to the electroluminescent element of my invention the top of which is provided with the free conducting layers.

EXAMPLE 3

As a free conducting layer, a plate of Nesa glass is employed. One side of the Nesa glass already coated with tin oxide is coated with a coating composition of ZnS particles dispersed in a solution of cyanoethylcellulose in a weight ratio of 4:1 to a thickness of 40 microns, and dried to a thickness of 10 microns to form a phosphor layer thereon. The remaining manufacturing steps are similar to those described in Example 1. It has been perceived that the whole phosphor layer emits light.

EXAMPLE 4

As a free conducting layer, a plate of Nesa glass is employed as Example 3. The remaining manufacturing steps are similar in Example 2.

Figure 9:
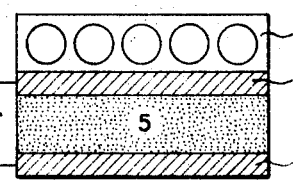
FIG. 9 is a diagrammatical sectional view of a simple and fundamental form of the second type of electroluminescent element in accordance with the present invention.

Next, the second type of my electroluminescent element will be descirbed. As shown in FIG. 9, the fundamental form thereof comprises an electrodes 3, a dielectric layer 5, aud another electrode 4 being provided on the opposite side of the dielectric layer 5 from the phosphor layer 1 to form a laminated body. As clearly shown in FIG. 9, the second type electroluminescent element is entirely different from the known one in that the latter comprises a phosphor layer sandwiched between a pair of electrodes while the former comprises a phosphor layer, an electrode, a dielectric layer, and another electrode in the form of a laminated body. I have also discovered that my second type electroluminescent element emits light from the top phosphor layer by applying voltage to the two electrodes contrary to the expectation of a person skilled in the art.

FIG. 10 shows an electroluminescent element comprising a pair of dielectric layers 2 and 5 and a pair of electrodes 3 and 4 provided on one side of the phosphor layer 1.

The materials for use as the phosphor layer, electrodes and dielectric layer are all similar to those of the first type electroluminescent element of my invention.

The less the thickness of the dielectric the more the brightness increases. As the dielectric layer is made of a high dielectric material resistant to a high voltage, it is possible to reduce its thickness without any danger of insulation breakdown so that a greater brightness can be attained at the same voltage than with the thicker one.

The precise theory of the improved photoemission effect due to the presence of the dielectric layer is not known, but is seems that the high dielectric layer is subjected to polarization owing to the voltage applied thereto, and the electric field is produced not only in the electrodes but also outside them with the result that the electric field outside will excite the phosphor layer to emit light.

It has also been discovered in this second type that a semi-conductor such as ZnS hitherto considered not able to emit light when excited by direct current will emit light when excited by direct current, and further, a semiconductor such as GaP hitherto regarded not able to emit light when excited by alternating current will emit light when excited by alternating current.

By this invention, a photoconductive semiconductor such as ZnO can be excited and employed as a photoconductive element. Furthermore, this invention can be widely used for the combination of other elements such as electrophotoluminescent elements, photoelectroluminescent elements, and ferroelectric ceramic elements for many industrial applications.

The examples in connection with FIGS. 9–10 showing the second type electroluminescent element of this invention will be described hereinbelow.

EXAMPLE 5

A composition of barium titanate powder dispersed in a solution of high molecular dielectric substance such as cyanoethylcellulose in a weight ratio of 4:1 is coated on an aluminum foil to a thickness of 40 microns, and dried to a thickness of about 15 microns to form a high dielectric layer thereon. Another coating layer of dielectric material is coated on the other side of the aluminum foil. Then, a mixture of ZnS and cyanoethylcellulose in a weight ratio of 4:1 is coated on the high dielectric layer to a thickness of 40 microns, and dried to a thickness of 10 microns to form a phosphor layer. Another aluminum foil is also provided as one of the pair of electrodes. This is shown in FIG. 10. It has been found that the electroluminescent element of FIG. 10 emits light when 100 v., 60 cycle is applied to the electrodes.

It has also been shown that the electroluminescent element of FIG. 9 emits light by not only when alternating voltage is applied but also when direct voltage is applied, and when superposed alternating and direct voltages are applied thereto, and further, GaP in place of ZnS can also emit light.

EXAMPLE 6

In this example, a phosphor layer is obtained by mixing equal parts by weight of phosphor particles and of barium titanate powder and coating it to a thickness of 10 microns to dry to the thickness of 1 micron. The remaining steps are the same as in Example 5. It has been found that the electroluminescent element containing this phosphor layer emits light brighter than that of Example 5.

It is seen that the second type electroluminescent elements of FIGS. 9–10 can be provided with a free conducting layer (see FIGS. 11–12) on the top thereof of advantage as described in connection with FIGS. 5–8.

A symmetrical construction of electroluminescent elements in FIGS. 9–12 is also possible as mentioned in connection with FIGS. 1–8, and it has been found that both phosphor layers emit light with the same voltage applied, and having no less brightness.

In reference to the shape of the phosphor and electric conducting layers, I have described it as a flat layer, but it is understood that these materials can be formed into any shape, such as a strip, grid, letter or any other desired shape.

The Examples 7–9 corresponding to FIGS. 11–12 will be described hereinbelow.

EXAMPLE 7

A coating composition of barium titanate powder dispersed in a solution of cyanoethylcellulose is coated on an aluminum foil to form a dielectric layer thereon as described in Example 5. Aluminum is vacuum plated on this dielectric layer. On this aluminum layer the above described coating composition of barium titanate is coated to a thickness of 10 microns. Then, on this dielectric layer a phosphor composition of ZnS powder dispersed in cyanoethylcelluose in a weight ratio of 4:1 is coated to a thickness of 40 microns and dried to a thickness of 10 microns to form a phosphor layer. On this phosphor layer is adhered an electric conducting layer of Nesa glass to obtain an electroluminescent element as shown in FIG. 12. It has been found that this element emits light with a brightness corresponding to 100–120 microampere by applying 100 v., 60 cycle to the aluminum electrodes.

EXAMPLE 8

In the electroluminescent element of FIG. 12, as a high dielectric material, a ceramic layer 10 microns thick sintered from barium titanate is used, and on both sides of this dielectric layer a pair of aluminum electrodes are vacuum plated. The remainder of the element is as described in Example 7. This element emits light with a brightness corresponding to 120 microampere.

EXAMPLE 9

In the electroluminescent element of FIG. 12, one side of a high dielectric layer into which an aluminum foil has been embedded is vacuum coated with a phosphor layer while the other side is coated with aluminum. It has been found that this element emits light with a brightness corresponding to 180 microampere by applying 100 v., 60 cycle thereto.

It has also been discovered that the electroluminsecent elements as shown in FIGS. 13–15 having another dielectric layer added thereto together with another electric conducting layer emit light with more brightness. FIG. 13 shows a phosphor top layer 1, an electrode 3, a dielectric layer 5, an electrode 4, a dielectric layer 7, and an electric conducting bottom layer 8. FIG. 14 shows a phosphor top layer 1, three dielectric layers 2, 5 and 7, and two electrodes 3 and 4 and one electric conducting layer 8. FIG. 15 shows a phosphor layer 1, four dielectric layers 2, 5, 7 and 9, and four electric conducting layers 3, 4, 8 and 10.

It has been discovered that the more the dielectric layers the more brightness. The precise theory is not known, but it seems the theory described hereinbefore holds true in this case.

In reference to the voltage applied to the elements of FIGS. 13–15, any voltage, alternating, direct or superposed alternating and direct, may be applied.

The Examples 10–11 in connection with FIGS. 14–15 will be described hereinbelow.

EXAMPLE 10

A dispersion coating of barium titanate powder in a cyanoethylcellulose solution is coated on an aluminum foil, and dried to a thickness of about 10 microns to form a high dielectric layer thereon as described hereinbefore. Two additional layers consisting of the dielectric layer and the aluminum foil are formed, and on the dielectric layer a mixed coating composition of GaP powder in cyanoethycllulose in a weight ratio of 4:1 is coated to a thickness of 40 microns, and dried to a thickness of 10 microns to form a semiconductor or phosphor layer. The electroluminescent element of FIG. 14 containing GaP emits light by applying 100 v., 60 cycle thereto. Further, the electroluminescent element of FIG. 13 having no layer of dielectric material emits light, too.

EXAMPLE 11

In this example, a phosphor layer is obtained from the steps of making a dispersion of equal parts by weight of phosphor particles and barium titanate powder in cyanoethylcellulose, coating it to a thickness of 10 microns, and drying it to the thickness of 1 micron. It has been found that the electroluminescent element of FIG. 15 made from this example emits light with a more brightness than that of Example 10.

I have described the free electric conducting layer hereinbefore to be provided on the phospher layer of the electroluminescent element of my invention. It is seen that the electroluminescent elements of FIGS. 13–15 can also be provided with the free electric conducting layers, respectively (FIGS. 16–17), and it has been found that they emit light with a greater brightness.

The following Examples 12 and 13 are almost the same as the foregoing ones except for the top electric conducting layers.

EXAMPLE 12

In the electroluminescent element of FIG. 17, the phosphor layer comprises ZnS, the dielectric layer barium titanate, and the electric conducting layer tin oxide 11 and the electric conducting layer 8.

EXAMPLE 13

The electroluminescent element of Example 11 is provided with a free conducting layer on its top. It has been found that this electroluminescent element emits light with a greater brightness than that of Example 12.

In the foregoing, I have described an improved electroluminescent element in accordance with the principle of this invention in connection with the Examples 1–13 shown by the accompanying drawings. The brightness of the novel electroluminescent element in connection with the devices containing the elements shown in FIGS. 1–17 will be indicated hereinbelow.

For a comparison of brightness, it is to be noted that the voltage and current to be applied to each of the electroluminescent elements of FIGS. 1–17 should be the same, and further, the materials constituting each of the phosphor, dielectric, electrode, and free conducting layers of the elements of FIGS. 1–17 should be one and the same in properties, size, shape and thickness.

It has been found that each electroluminescent element shown in FIGS. 1–17 has a "brightness index number" when an equal current is applied at the same voltage. Several methods for the indication of brightness in reference to the electroluminescent device have been proposed, but the present invention adopts the "brightness index number" which is higher the brighter the light in the following list.

LIST OF BRIGHTNESS

The element of FIGS.

| | |
|---|---|
| 1 | 150 |
| 2 | 100 |
| (This is the standard) | |
| 3 | 165–180 |
| 4 | 110–120 |
| 5 | 165–180 |
| 6 | 110–120 |
| 7 | 181–198 |
| 8 | 121–132 |
| 9 | 150 |
| 10 | 100 |
| 11 | 165–180 |
| 12 | 110–120 |
| 13 | 165–180 |
| 14 | 110–120 |
| 15 | 121–132 |
| 16 | 181 |
| 17 | 121 |

It has been found that when the free conducting layer is provided, the brightness increases by 10–20%; when the dielectric layer is provided at the bottom, the brightness increases by 10–20%, and when there is a dielectric layer between the phosphor layer and the electrode layer, the brightness decreases by 50%.

The preferred embodiments of the invention which have been illustrated and described herein in detail are intended as illustrative and not in order to limit the invention thereto. Various modifications may be made in the construction of the invention without departing from the spirit or scope thereof and it is understood that I limit myself only as defined in the appended claims.

I claim:

1. An electroluminescent element consisting essentially of a phosphor layer, a pair of electrodes, a dielectric layer associated therewith, said dielectric layer being between said electrodes and assembled in a laminated structure with said phosphorous layer as an outside layer, and a free transparent electrically conducting layer on the free surface of said phosphor layer.

2. An electroluminescent element consisting essentially of a phosphor layer, a pair of electrodes, a dielectric layer associated therewith, said dielectric layer being between said electrodes and assembled in a laminated structure with said phosphor layer as an outside layer, a further dielectric layer on the free surface of the electrode farthest from the phosphor layer, and an electrically conducting layer on the free surface of said further dielectric layer.

3. An electroluminescent element as claimed in claim 2 further comprising a free transparent electrically conducting layer on the free surface of said phosphor layer.

4. An electroluminescent element as claimed in claim 2 further comprising an added dielectric layer on the free surface of said electrically conducting layer farthest from said phosphor layer and an added electrically conducting layer on the free surface of said added dielectric layer.

5. An electroluminescent element as claimed in claim 4 further comprising a free transparent electrically conducting layer on the free surface of said phosphor layer.

6. An electroluminescent element consisting essentially of a phosphor layer, a pair of electrodes, a dielectric layer associated therewith, said dielectric layer being between said electrodes and assembled in a lamined structure with said phosphor layer as an outside layer, and further a dielectric layer between the electrode closest to said phosphor layer and said phosphor layer.

7. An electroluminescent element as claimed in claim 6 further comprising a free transparent electrically conducting layer on the free surface of said phosphor layer.

8. An electroluminescent element as claimed in claim 6 further comprising an added dielectric layer on the free surface of said electrode farthest from the phosphor layer and an electrically conducting layer on the free surface of said added dielectric layer.

9. An electroluminescent element as claimed in claim 8 further comprising a free transparent electrically conducting layer on the free surface of said phosphor layer.

10. An electroluminescent element as claimed in claim 8 further comprising an additional dielectric layer on the free surface of said electrically conducting layer, and an additional electrically conducting layer on the free surface of said additional dielectric layer.

11. An electroluminescent element as claimed in claim 10 further comprising a free transparent electrically conducting layer on the free surface of said phosphor layer.

References Cited

UNITED STATES PATENTS

| | | | |
|---|---|---|---|
| 2,768,310 | 10/1956 | Kazan et al. | 313—108 X |
| 2,988,661 | 6/1961 | Goodman | 313—108 |
| 3,274,024 | 9/1966 | Hill et al. | 313—108 X |

OTHER REFERENCES

"Experiments on Electroluminescence," by John F. Waymouth and Francis Bitter, Physical Review volume 95, No. 4, Aug. 15, 1954, pp. 941–949.

RAYMOND F. HOSSFELD, Primary Examiner

U.S. Cl. X.R.

317—235